United States Patent
Park

(10) Patent No.: US 6,219,383 B1
(45) Date of Patent: Apr. 17, 2001

(54) METHOD AND APPARATUS FOR SELECTIVELY DETECTING MOTION VECTORS OF A WAVELET TRANSFORMED VIDEO SIGNAL

(75) Inventor: Sung-Joo Park, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/093,748

(22) Filed: Jun. 8, 1998

(30) Foreign Application Priority Data

Jun. 30, 1997 (KR) .................................................. 97-29478

(51) Int. Cl.⁷ ...................................................... H04N 7/50
(52) U.S. Cl. ................ 375/240.16; 348/699; 375/240.19
(58) Field of Search ......................... 375/240.16, 240.19; 648/699; H04N 7/50

(56) References Cited

U.S. PATENT DOCUMENTS

| 5,477,272 | * | 12/1995 | Zhang et al. ..................... 348/699 X |
| 5,937,097 | * | 8/1999 | Lennon ........................... 375/240.19 |
| 6,084,912 | * | 7/2000 | Reitmeier et al. ................ 375/240.19 |
| 6,160,846 | * | 12/2000 | Chaing et al. .................... 375/240.19 |

* cited by examiner

*Primary Examiner*—Howard Britton
(74) *Attorney, Agent, or Firm*—Anderson Kill & Olick, PC

(57) ABSTRACT

A method and apparatus for motion estimating between a current and a previous frames in a video signal derives a wavelet representation of the current and previous frames to thereby generate M layers and storing a current subimage of a lowest frequency band for each layer of each frame, wherein each layer has a corresponding resolution and M is a positive integer. A motion vector of each search block in a current subimage of a lowest frequency band in an Mth layer is detected with respect to a corresponding previous subimage based on motion vectors of neighboring search blocks and a motion vector of each search block in a current subimage of a lowest frequency band in an (M−i)th layer is detected with respect to a corresponding previous subimage based on motion vectors of neighboring search blocks and a scaled motion vector of a corresponding search block in the current subimage of the lowest frequency band in the (M−i+1)st layer, wherein i is an integer ranging from 1 to M−1.

14 Claims, 7 Drawing Sheets

METHOD AND APPARATUS FOR SELECTIVELY DETECTING MOTION VECTORS OF A WAVELET TRANSFORMED VIDEO SIGNAL

FIELD OF THE INVENTION

The present invention relates to a motion estimation method and apparatus; and, more particularly, to a method and apparatus for selectively detecting motion vectors of a wavelet transformed video signal.

DESCRIPTION OF THE PRIOR ART

The discrete wavelet transform (DWT) technique has recently attracted a considerable amount of attention in the art of image processing due to its flexibility in representing nonstationary image signals and its ability to adapt to human visual characteristics. A wavelet representation provides a multi-resolution/multi-frequency expression of a signal localized in both time and frequency.

Such versatilities are desirable in image and video coding applications. Since natural image and video signals are nonstationary in nature and a wavelet transform decomposes a nonstationary signal into a set of multi-scaled wavelets where each component becomes relatively more stationary, such transform method makes it easier to encode such nonstationary signals. Also, coding schemes and parameters can be adapted to the statistical properties of each wavelet, and hence coding each stationary component is more efficient than coding the whole nonstationary signal. In addition, the wavelet representation matches well with the spatially-tuned, frequency modulated properties experienced in human vision as reported by the research in psychophysics and physiology.

In a typical wavelet decomposition technique (see, e.g., U.S. Pat. No. 5,477,272 issued to Ya-Qin Zhang on Dec. 19, 1995), a video frame is decomposed into a plurality of layers with different resolutions, each subimage being in a same layer corresponding to each of different frequency bands. FIG. 1 illustrates a conventional wavelet decomposition process wherein a current frame $S_1$ is applied to a first wavelet decomposition block 110 and decomposed into subimages of layer 1, i.e., $S_2$, $W_2^1$, $W_2^2$ and $W_2^3$. Then, the subimage $S_2$ is applied to a second wavelet decomposition block 120 and decomposed into subimages of layer 2, i.e., $S_4$, $W_4^1$, $W_4^2$, $W_4^3$. Thereafter, the subimage $S_4$ is applied to a third wavelet decomposition block 130 and decomposed into subimages of layer 3, i.e., $S_8$, $W_8^1$, $W_8^2$, $W_8^3$.

These subimages can be organized into a pyramid structure to provide a pictorial representation as shown in FIG. 2. The wavelet transformed current frame $S_1$ has a resolution depth of 3 and consists of 10 subimages, with 3 subimages at each layer and one lowpass subimage. The subimage $S_4$ is formed by combining the subimage $S_8$ with the subimages $W_8^1$ to $W_8^3$ in the layer 3; the subimage $S_2$ is formed by combining the subimage $S_4$ with the subimages $W_4^1$ to $W_4^3$ in the layer 2; and the current frame $S_1$ is formed by combining the subimage $S_2$ with the subimages $W_2^1$ to $W_2^3$ in the layer 1.

Referring to FIG. 3A, there is depicted a conventional multi-resolution motion estimation (MRME) scheme. First, a current frame $S_1$ is decomposed to thereby generate subimages $S_8$, $W_8^1$, $W_8^2$, $W_8^3$, $W_4^1$, $W_4^2$, $W_4^3$, $W_2^1$, $W_2^2$ and $W_2^3$, and a previous frame $PS_1$ is also decomposed to yield subimages $PS_8$, $PW_8^1$, $PW_8^2$, $PW_8^3$, $PW_4^1$, $PW_4^2$, $PW_4^3$, $PW_2^1$, $PW_2^2$ and $PW_2^3$, wherein the previous frame $PS_1$ and its subimages $PS_8$, $PW_8^1$, $PW_8^2$, $PW_8^3$, $PW_4^1$, $PW_4^2$, $PW_4^3$, $PW_2^1$, and $PW_2^3$ are not shown, for the sake of simplicity.

Then, each of the subimages of the $S_1$ is divided into a plurality of search blocks, wherein the sizes of search blocks within subimages of a same layer are identical. If the size of a search block within a subimage of a highest layer M is p×p, the size of a search block within a subimage of a layer m is $p \cdot 2^{M-m} \times p \cdot 2^{M-m}$, M, p and m being positive integers, respectively, wherein typical values of M and p are 3 and 2, respectively.

Thereafter, each search block in each subimage is motion estimated with reference to a corresponding subimage of the $PS_1$. For example, assuming that a search block 302 in the $S_8$ of FIG. 3A is motion estimated by using a conventional block matching algorithm, a search region corresponding to the search block 302 in the $S_8$ is formed in the $PS_8$ and a plurality of candidate blocks are generated in the search region. Then, error values between the search block 302 in the $S_8$ and the candidate blocks are calculated, wherein an error value is, e.g., a mean absolute error between a pixel value of the search block 302 in the $S_8$ and a corresponding pixel value of a candidate block.

Among the calculated error values, a minimum error value is selected and a difference between the search block 302 in the $S_8$ and an optimum candidate block 304 which yields the minimum error value is detected as a motion vector $MVS_8$ of the search block 302 in the $S_8$.

In motion estimating a search block 306 in the $W_8^1$, a search region corresponding to the search block 306 in the $W_8^1$ is formed in the $PW_8^1$ based on the $MVS_8$. Specifically, a location which is same as that of the search block 306 in the $W_8^1$ is detected and the detected location is displaced by as much as the $MVS_8$. The search region is formed around the displaced location and an optimum candidate block 308 is detected in the search region by motion estimating the search block 306 in the $W_8^1$ in a same manner as that of the search block 302 in the $S_8$. Search blocks in the $W_8^2$ and the $W_8^3$ are also motion estimated in a similar manner as that of the search block 306 in the $W_8^1$.

In motion estimating a search block 310 in the $W_4^1$, a search region corresponding to the search block 310 in the $W_4^1$ is formed in the $PW_4^1$ based on a scaled motion vector $2MVS_8$. That is, a location which is same as that of the search block 310 in the $W_4^1$ is detected and the detected location is displaced by as much as the $2MVS_8$. The search region is formed around the displaced location and an optimum candidate block 312 is detected in the search region by motion estimating the search block 310 in the $W_4^1$ in a same manner as that of the search block 306 in the $W_8^1$. Search blocks in the $W_4^2$ and the $W_4^3$ are also motion estimated in a similar manner as that of the search block 310 in the $W_4^1$.

In motion estimating a search block 314 in the $W_2^1$, a search region corresponding to the search block 314 in the $W_2^1$ is formed in the $PW_2^1$ based on a scaled motion vector $4MVS_8$. Specifically, a location which is same as that of the search block 314 in the $W_2^1$ is detected and the detected location is displaced by as much as the $4MVS_8$. The search region is formed around the displaced location and an optimum candidate block 316 is detected in the search region by motion estimating the search block 314 in the $W_2^1$ in a same manner as that of the search block 310 in the $W_4^1$. Search blocks in the $W_2^2$ and the $W_2^3$ are also motion estimated in a similar manner as that of the search block 314 in the $W_2^1$.

Meanwhile, if an optimum candidate block 316 corresponding to the search block 314 in the $W_2^1$ is detected as is shown in FIG. 3A, a displacement from the search block 314 in the $W_2^1$ to an optimum candidate block 318 is $MVW_2^1$. Then, a difference between the $4MVS_8$ and the $MVW_2^1$ is calculated and provided as a motion vector difference $MVDW_2^1$ of the search block 314 of the $W_2^1$.

In such a MRME scheme, motion vectors for all subimages are detected and transferred, thereby complicating the computational process. Thus, a motion estimation scheme only for subimages of low frequency bands is developed as shown in FIG. 3B. The new scheme is based on the concept that the subimage $S_8$ contains a major portion of the total energy present in the current frame $S_1$ although its size is only 1/64 of that of $S_1$ and human vision is more perceptible to errors in lower frequency bands than those occurring in higher bands.

According to the new scheme depicted in FIG. 3B, a motion vector $MV_8$ between a search block 318 in the $S_8$ and a corresponding optimum candidate block 320 is scaled by 2 and used as an initial vector of a search block 322 in the $S_4$ to thereby detect a motion vector $MV_4$ and a motion vector difference $MVD_4$, wherein the $MVD_4$ is a difference between $2MV_8$ and the $MV_4$; the motion vector $MV_4$ between the search block 322 in the $S_4$ and a corresponding candidate block 324 is scaled by 2 and used as an initial vector of a search block 326 in the $S_2$ to thereby detect a motion vector $MV_2$ and a motion vector difference $MVD_2$, wherein the $MVD_2$ is a difference between $2MV_4$ and the $MV_2$; and the motion vector $MV_2$ between the search block 326 in the $S_2$ and a corresponding candidate block 328 is scaled by 2 and used as an initial vector of a search block 330 in the $S_1$ to thereby detect a motion vector $MV_1$ and a motion vector difference $MVD_1$, wherein the $MV_1$ is a displacement between the search block 330 and a corresponding candidate block 332 and the $MVD_1$ is a difference between $2MV_2$ and the $MV_1$.

By motion estimating only subimages of low frequency bands, the computational process can be simplified. However, a search region of the $S_4$ is formed based on a motion vector of a search block of the $S_8$ to thereby detect a motion vector of a search block of the $S_4$. Thus, if the motion vector of the search block of the $S_8$ is erroneously detected, the search region of the $S_4$ is formed at inappropriate locations and the probability to inaccurately detect the motion vector is increased. Accordingly, it is still necessary to detect a motion vector of a search block of the $S_8$ and form search regions of the subimages of lower layers as precisely as possible.

SUMMARY OF THE INVENTION

It is, therefore, a primary object of the invention to provide a method and apparatus for selectively detecting motion vectors of a wavelet transformed video signal.

In accordance with one aspect of the present invention, there is provided a method for motion estimating between a current and a previous frames in a video signal, comprising the steps of: (a) deriving a wavelet representation of the current frame to thereby generate M layers, M being a positive integer and storing a current subimage of a lowest frequency band for each layer, wherein each layer has a corresponding resolution level and a current subimage of a lowest frequency band for a 1st layer corresponds to the current frame; (b) deriving a wavelet representation of the previous frame to thereby generate M layers and storing a previous subimage of a lowest frequency band for each layer, wherein each layer has a corresponding resolution level and a previous subimage of a lowest frequency band for a 1st layer corresponds to the previous frame; (c) detecting a motion vector of each search block in a current subimage of a lowest frequency band in an Mth layer having a resolution of a lowest level with respect to a corresponding previous subimage based on motion vectors of neighboring search blocks to thereby provide the motion vector of each block in the current subimage of the lowest frequency band in the Mth layer, wherein the neighboring search blocks are adjacent to the search block and the motion vectors of the neighboring search blocks have been detected; and (d) detecting a motion vector of each search block in a current subimage of a lowest frequency band in an (M−i)th layer with respect to a corresponding previous subimage based on motion vectors of neighboring search blocks and a scaled motion vector of a corresponding search block in the current subimage of the lowest frequency band in the (M−i+1)st layer to thereby provide the motion vector of each block in the current subimage of the lowest frequency band in the 1st layer, wherein i is an integer ranging from 1 to M−1.

In accordance with another aspect of the present invention, there is provided an apparatus for detecting motion vectors between a current and a reference frames of a video signal, comprising: means for wavelet transforming the current frame to thereby produce an M number of hierarchical current images with M being greater than 1, wherein a current image of a highest hierarchy corresponds to the current frame, a current image of a higher hierarchy has a higher resolution than a current image of a lower hierarchy, and the respective current images have an identical number of search blocks, each search block of the lower hierarchy corresponding to a search block of the higher hierarchy; means for wavelet transforming the reference frame to provide an M number of hierarchical reference images, wherein a reference image of a highest hierarchy corresponds to the reference frame, a reference frame of a hierarchy including candidate blocks corresponding to each search block of the hierarchy and sizes of each search block of the hierarchy and the candidate blocks corresponding thereto being identical to each other; means for finding an optimum candidate block of a search block of the lowest hierarchy based on displacement vectors of neighboring search blocks to thereby detect a displacement vector for the search block, wherein the neighboring search blocks are adjacent to the search block and whose displacement vectors are already detected and the displacement vector represents the displacement between the search block and the optimum candidate block; and means for obtaining a displacement vector of a search block of the highest hierarchy based on the detected displacement vector and thereby setting the obtained displacement vector as a motion vector of the search block of the highest hierarchy.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4:
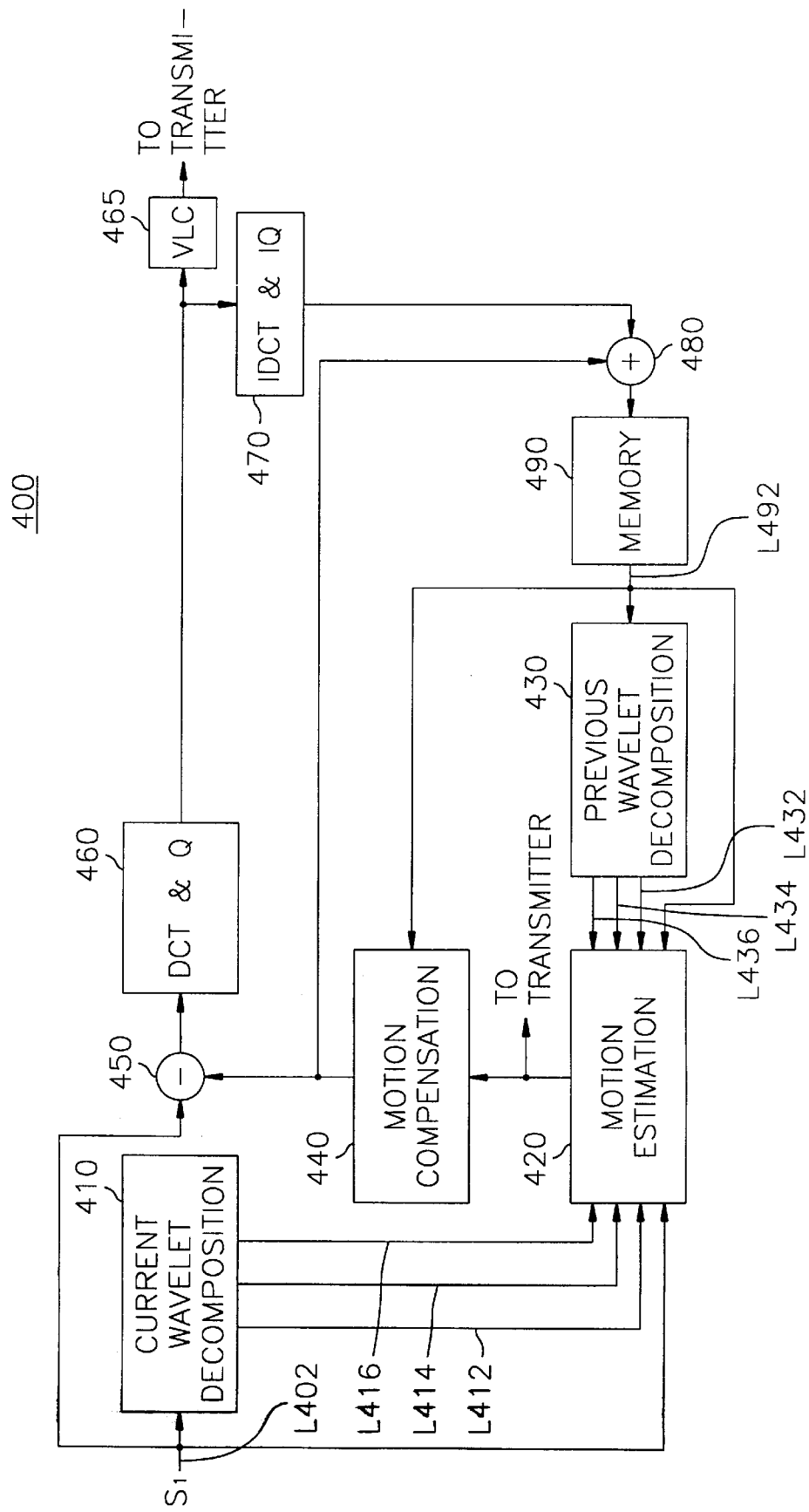
FIG. 4 is a block diagram of an encoding system in accordance with a preferred embodiment of the present invention.

Referring to FIG. 4, there is provided an apparatus 400 for selectively detecting motion vectors of a wavelet transformed video signal in accordance with a preferred embodiment of the present invention.

Figure 1:
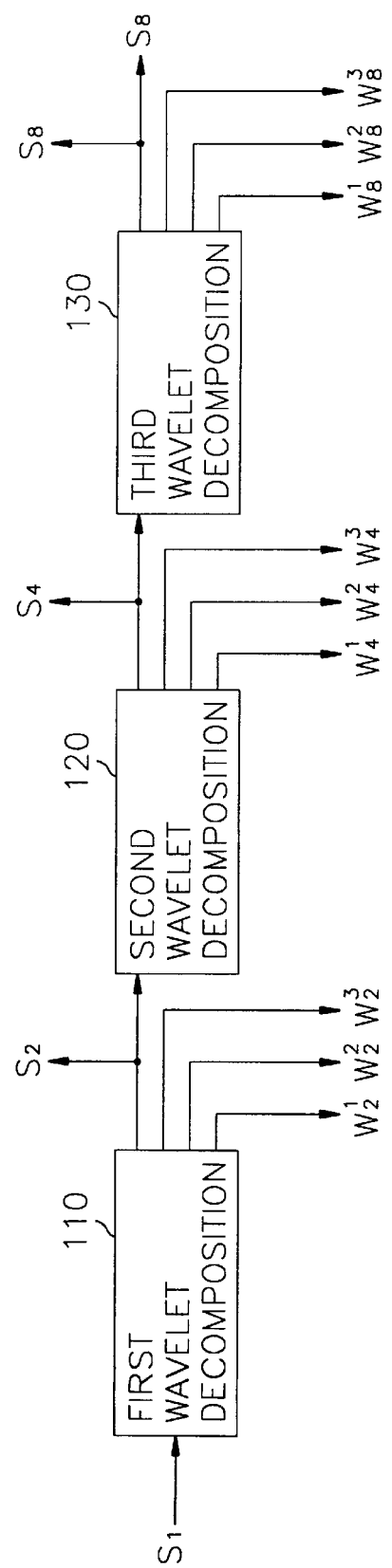
FIG. 1 illustrates a conventional wavelet decomposition process.
Figure 2:
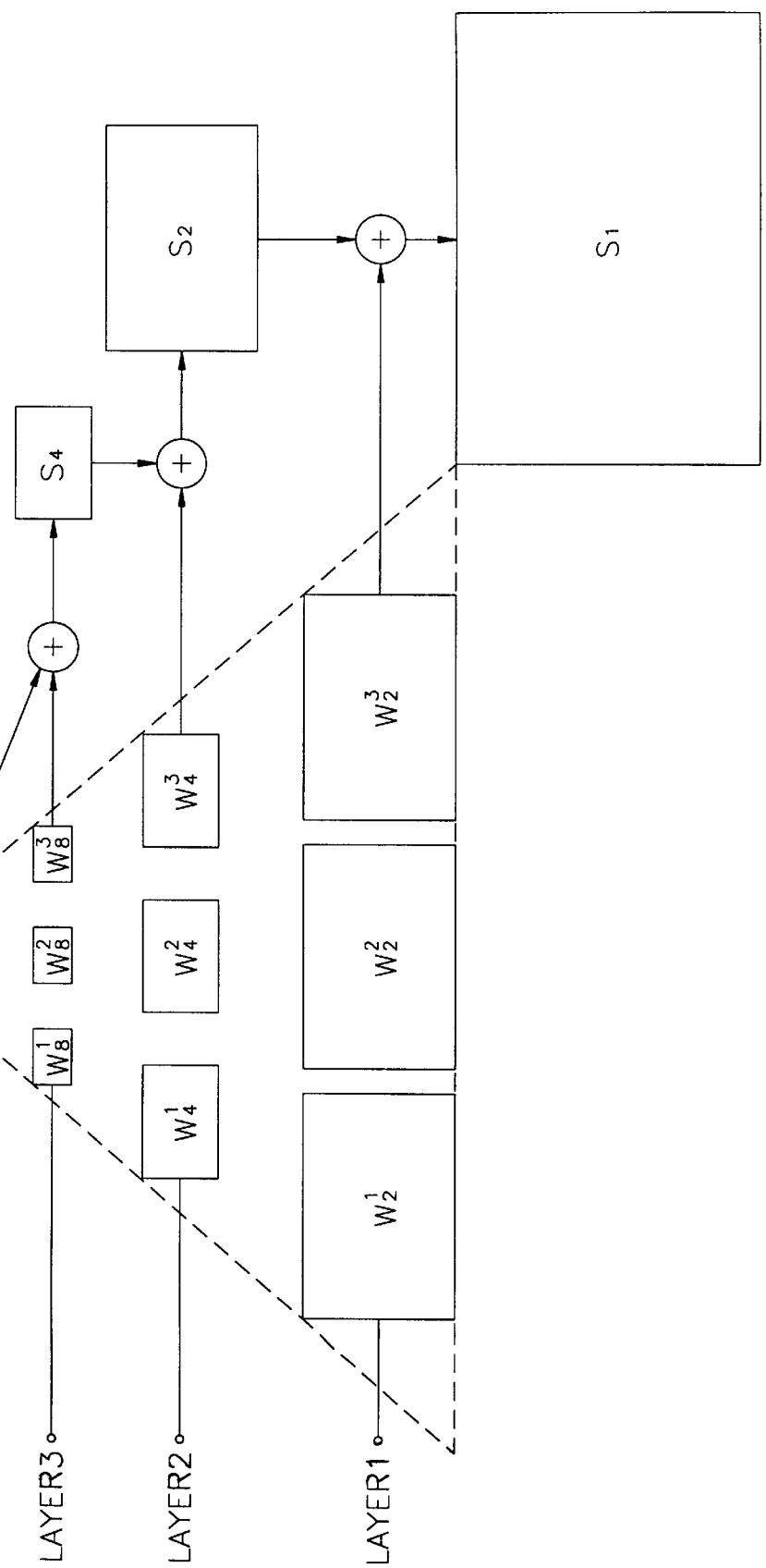
FIG. 2 provides a pictorial representation of a pyramid structure of wavelet transformed subimages.
Figure 3A:
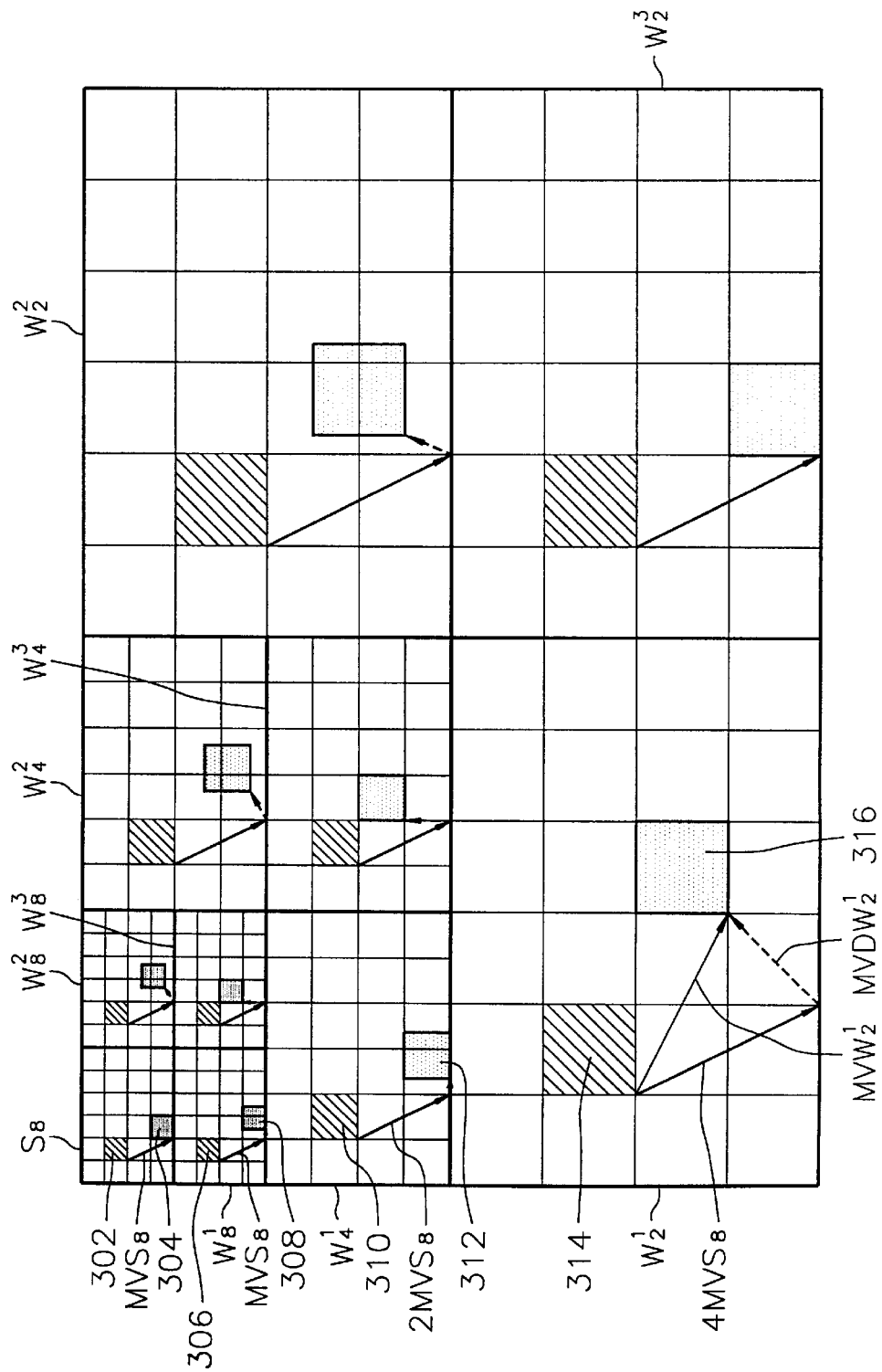
FIG. 3A presents a conventional multi-resolution motion estimation (MRME) scheme.
Figure 3B:
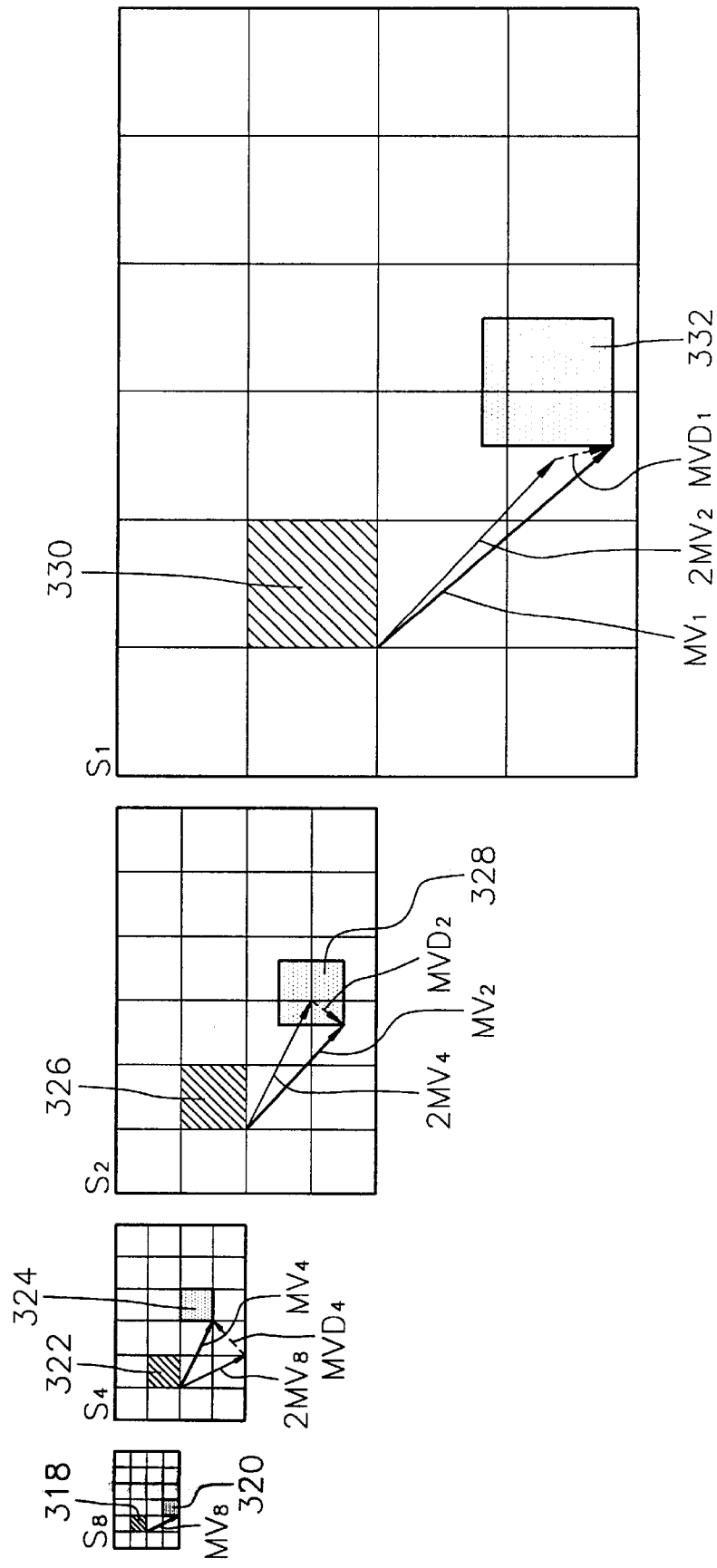
FIG. 3B shows a motion estimation scheme only for subimages of low frequency bands.

A current frame $S_1$ is applied to a current wavelet decomposition block 410 and a motion estimation block 420 via a line L402. The current wavelet decomposition block 410 decomposes the $S_1$ into subimages as is shown in FIGS. 1 and 2, and provides current subimages of low frequency bands, i.e., $S_2$, $S_4$ and $S_8$ to the motion estimation block 420 via lines L412, L414 and L416, respectively.

Meanwhile, a previous frame $PS_1$ is applied from a memory 490 to a previous wavelet decomposition block 430, the motion estimation block 420 and a motion compensation block 440 via a line L492. Previous subimages of low frequency bands, i.e., $PS_2$, $PS_4$ and $PS_8$ are respectively provided from the previous wavelet decomposition block 430 to the motion estimation block 420 via lines L432, L434 and L436, wherein the $PS_2$, the $PS_4$ and the $PS_8$ are obtained by decomposing the $PS_1$ from the memory 490.

The motion estimation block 420 detects a motion vector for each search block in the $S_1$ and provides the same to the motion compensation block 440 and a transmitter (not shown). The detailed motion estimation process of the motion estimation block 420 will be further described with reference to FIGS. 5 and 6.

The motion compensation block 440 is provided with the motion vector from the motion estimation block 420 and a corresponding optimum candidate block in the $PS_1$ from the memory 490 via the line L492. The motion compensation block 440 motion compensates the optimum candidate block by using the motion vector and provides a motion compensated optimum candidate block to a subtraction block 450 and an addition block 480.

The subtraction block 450 subtracts the motion compensated optimum candidate block from the search block in the $S_1$ to thereby provide an error signal to an discrete cosine transform (DCT) and quantization (Q) block 460. The DCT & Q block 460 discrete cosine transforms and quantizes the error signal and provides a quantized discrete cosine transformed coefficient set to a variable length coding (VLC) block 465 and an inverse discrete cosine transform (IDCT) and inverse quantization (IQ) block 470. The VLC block 465 variable length codes the quantized discrete cosine transformed coefficient set to thereby provide the variable length coded signal to the transmitter. The IDCT & IQ block 470 inverse discrete cosine transforms and inverse quantizes the quantized discrete cosine transformed coefficient set and sends the restored error signal to the addition block 480. The addition block 480 adds the restored error signal to the motion compensated optimum candidate block to thereby generate a reconstructed search block in the $S_1$. Reconstructed search blocks of the $S_1$ are stored at the memory 480 as a previous frame for a next frame.

Figure 5:
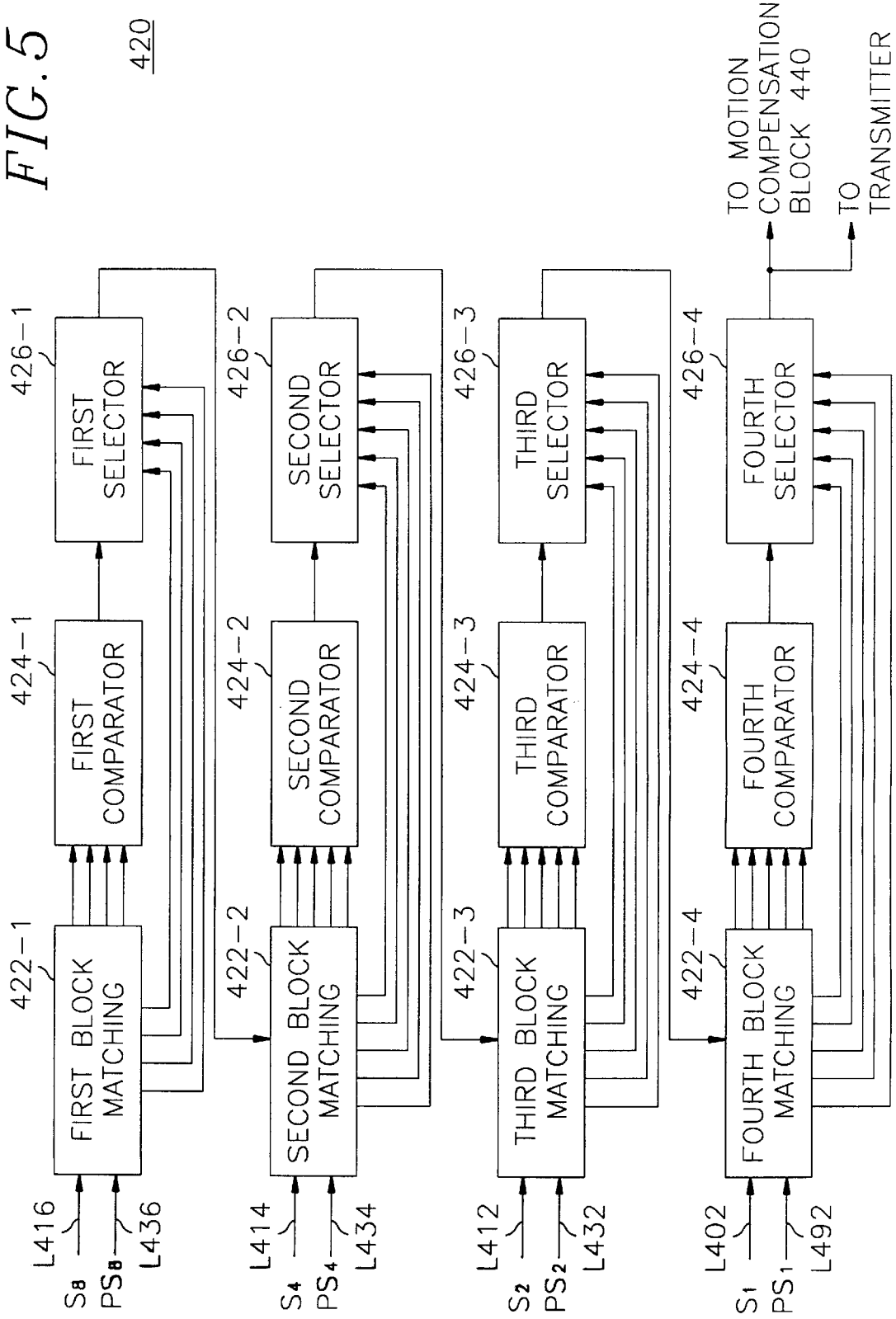
FIG. 5 depicts a detailed structure of a motion estimation block shown in FIG. 4.

Referring to FIG. 5, there is illustrated a detailed block diagram of the motion estimation block 420 shown in FIG. 4.

The first block matching unit 422-1 is provided with the $S_8$ on the line L416 and the $PS_8$ on the line L436. The $S_8$ is divided into a plurality of search blocks of a predetermined size p×p, e.g., 2×2 pixels. Then, more than one search region corresponding to a search block of the $S_8$ is formed in the $PS_8$ based on motion vectors of neighboring blocks, wherein the neighboring blocks are adjacent to the search block of the $S_8$ and motion vectors thereof are already detected.

Figure 6:
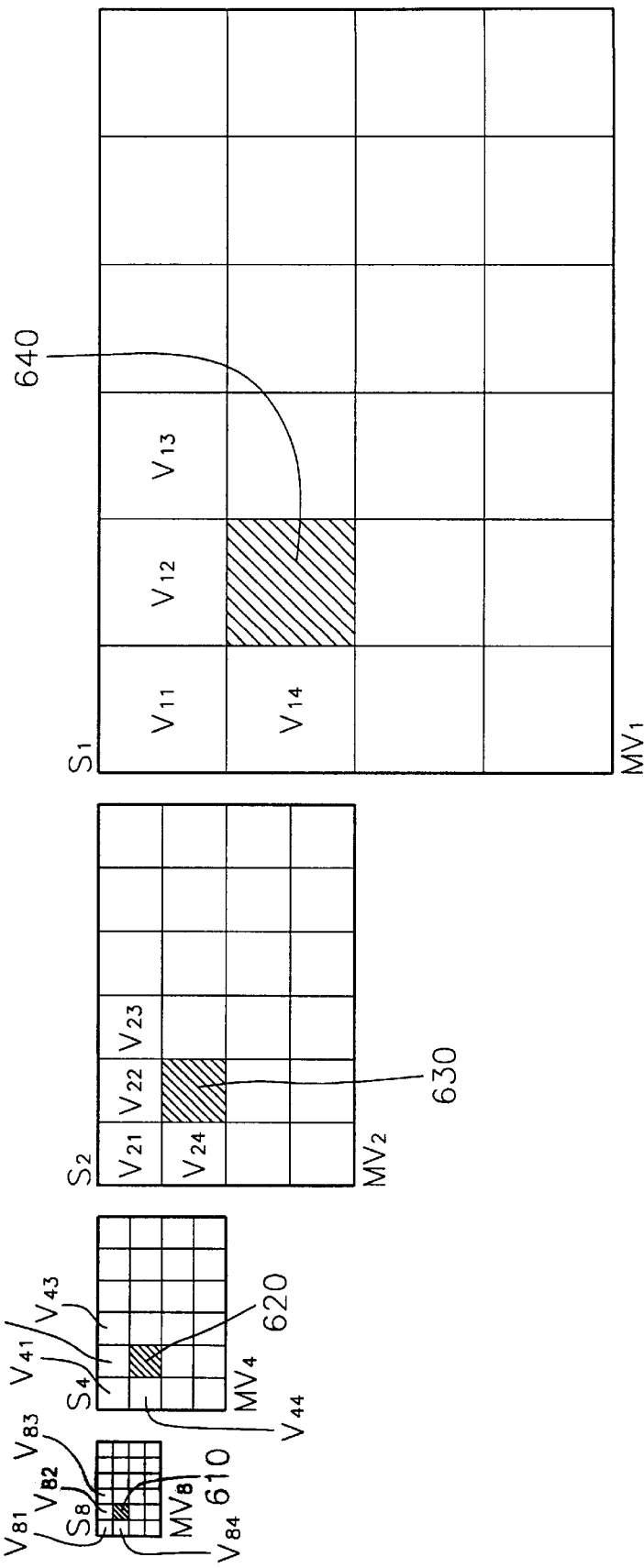
FIG. 6 explains a motion estimation scheme of the motion estimation block shown in FIG. 5.

Assume a case when a search block 610 of the $S_8$ that is shaded in FIG. 6 is motion estimated. 4 motion vectors of 4 neighboring blocks of the $S_8$ which are already detected are $V_{81}$, $V_{82}$, $V_{83}$ and $V_{84}$. First, a location which is same as that of the search block 610 of the $S_8$ is detected in the $PS_8$ and the detected location of the $PS_8$ is displaced by as much as $V_{81}$, $V_{82}$, $V_{83}$ and $V_{84}$ to thereby generate 4 displaced locations of the $PS_8$. Then, 4 search regions of the $PS_8$ are respectively formed around the 4 displaced locations of the $PS_8$ and the search block 610 of the $S_8$ is motion estimated in each of the 4 search regions. In each of the 4 search regions of the $PS_8$, a displacement from the search block 610 of the $S_8$ to a candidate block of the $PS_8$ which yields a minimum error and a corresponding error value are detected. 4 error values are applied to a first comparator 424-1 and corresponding 4 displacements are applied to a first selector 426-1.

The first comparator 424-1 compares the 4 error values with each other and provides a first indication signal representing which error value is minimum among the 4 error values to the first selector 426-1. The first selector 426-1, in response to the first indication signal, provides a displacement corresponding to the minimum error value to a second block matching unit 422-2 as a motion vector $MV_8$ of the search block 610 of the $S_8$.

The second block matching unit 422-2 is provided with the $S_4$ on the line L414, the $PS_4$ on the line L434 and the motion vectors $MV_8$'s of the search blocks in the $S_8$ from the first selector 426-1. The $S_4$ is divided into a plurality of search blocks of the $S_4$ of a predetermined size 2p×2p, e.g., 4×4 pixels. Then, one or more search regions of the $PS_4$ corresponding to a search block of the $S_4$ are formed in the $PS_4$ based on a scaled motion vector of the corresponding search block of the $S_8$ and motion vectors of neighboring blocks of the $S_4$, wherein the neighboring blocks of the $S_4$ are adjacent to the search block of the $S_4$ and motion vectors thereof are already detected and the scaled motion vector is obtained by multiplying the motion vector by 2.

Assume a case when a search block 620 of the $S_4$ that is shaded in FIG. 6 is motion estimated. A motion vector of the search block 610 of the $S_8$ is $MV_8$, 4 motion vectors of 4 neighboring blocks are $V_{41}$, $V_{42}$, $V_{43}$ and $V_{44}$. First, a location of the $PS_4$ which is same as that of the search block 620 of the $S_4$ is detected in the $PS_4$ and the detected location of the $PS_4$ is displaced by as much as $2MV_8$, $V_{41}$, $V_{42}$, $V_{43}$ and $V_{44}$ to thereby generate 5 displaced locations of the $PS_4$. Then, 5 search regions of the $PS_4$ are respectively formed around the 5 displaced locations of the $PS_4$ and the search block 620 of the $S_4$ is motion estimated in each of the 5 search regions of the $PS_4$. In each of the 5 search regions of the $PS_4$, a displacement from the search block 620 of the $S_4$ to a corresponding candidate block of the $PS_4$ which yields a minimum error and a corresponding error are detected. 5 error values are applied to a second comparator 424-2 and corresponding 5 displacements are applied to a second selector 426-2.

The second comparator 424-2 compares the 5 error values with each other and provides a second indication signal representing which error value is minimum among the 5 error values to the second selector 426-2. The second selector 426-2, in response to the second indication signal, provides a displacement corresponding to the minimum error to a third block matching unit 422-3 as a motion vector $MV_4$ of the search block 620 of the $S_4$.

A motion vector $MV_2$ of a search block 630 of the $S_2$ is detected by using the $S_2$ on the line L412 and $PS_2$ on the line L432 based on the $2MV_4$, $V_{21}$, $V_{22}$, $V_{23}$ and $V_{24}$. And a motion vector $MV_1$ of a search block 640 in the $S_1$ is detected by using the $S_1$ on the line L402 and $PS_1$ on the line L492 based on the $2MV_2$, $V_{11}$, $V_{12}$, $V_{13}$ and $V_{14}$. A process to detect the $MV_2$ and the $MV_1$ is similar to the process to detect the $MV_4$, wherein the third block matching unit 422-3 and a fourth block matching unit 422-4 will play the role of the second block matching unit 422-2; a third comparator 424-3 and a fourth comparator 424-4 will replace the role of the second comparator 424-2; and a third selector 426-3 and a fourth selector 426-4 will replace the second selector 426-2.

A motion vector $MV_1$ of a search block of the $S_1$ which is detected through the above process is provided to the motion compensation block 440 and the transmitter.

In accordance with the present invention, a motion vector of a search block in a subimage can be detected with more precision since search regions are formed based on a scaled motion vector of a corresponding search block in a subimage of an upper layer and motion vectors of neighboring blocks which are adjacent to the search block.

While the present invention has been described with respect to certain preferred embodiments only, other modifications and variations may be made without departing from the spirit and scope of the present invention as set forth in the following claims.

What is claimed is:

1. A method for motion estimating between a current and a previous frames in a video signal, comprising the steps of:
   (a) deriving a wavelet representation of the current frame to thereby generate M layers, M being a positive integer and storing a current subimage of a lowest frequency band for each layer, wherein each layer has a corresponding resolution level and a current subimage of a lowest frequency band for a 1st layer corresponds to the current frame;
   (b) deriving a wavelet representation of the previous frame to thereby generate M layers and storing a previous subimage of a lowest frequency band for each layer, wherein each layer has a corresponding resolution level and a previous subimage of a lowest frequency band for a 1st layer corresponds to the previous frame;
   (c) detecting a motion vector of each search block in a current subimage of a lowest frequency band in an Mth layer having a resolution of a lowest level with respect to a corresponding previous subimage based on motion vectors of neighboring search blocks to thereby provide the motion vector of each block in the current subimage of the lowest frequency band in the Mth layer, wherein the neighboring search blocks are adjacent to the search block and the motion vectors of the neighboring search blocks have been detected; and
   (d) detecting a motion vector of each search block in a current subimage of a lowest frequency band in an (M−i)th layer with respect to a corresponding previous subimage based on motion vectors of neighboring search blocks and a scaled motion vector of a corresponding search block in the current subimage of the lowest frequency band in the (M−i+1)st layer to thereby provide the motion vector of each block in the current subimage of the lowest frequency band in the 1st layer, wherein i is an integer ranging from 1 to M−1.

2. The method as recited in claim 1, wherein the step (c) includes the steps of:
   (c1) dividing the current subimage of the lowest frequency band in the Mth layer into a multiplicity of search blocks, the size of the search blocks being p×p pixels, p being a positive integer;
   (c2) forming one or more search regions in the corresponding previous subimage for each search block based on motion vectors of neighboring search blocks;
   (c3) generating a plural number of candidate blocks in each search region for each search block;
   (c4) calculating error values between each of the search blocks and candidate blocks to thereby select an optimum candidate block for each search region for said each of the search blocks, wherein the optimum candidate block yields a minimum error value;
   (c5) comparing error values of optimum candidate blocks for said each of the search blocks with each other to thereby select a smallest error value; and
   (c6) providing displacements from the search blocks to the optimum candidate blocks corresponding to the smallest error value as a motion vector of said each of the search blocks in the current subimage.

3. The method as recited in claim 2, wherein the step (c2) includes the steps of:
   (c21) detecting a location, which is same as that of a search block, in the previous subimage of the lowest frequency band in the (M−i)th layer, for each search block;
   (c22) displacing the detected location by as much as motion vectors of neighboring search blocks to thereby generate displaced locations, for each search block; and
   (c23) forming search regions around the displaced locations, for each search block.

4. The method as recited in claim 3, wherein the step (d) includes the steps of:
   (d1) dividing the current subimage of the lowest frequency band in the (M−i)th layer into a multiplicity of search blocks, the size of the search blocks being $p \cdot 2^i \times p \cdot 2^i$ pixels;
   (d2) forming one or more search regions in the corresponding previous subimage for each search block, based on motion vectors of neighboring search blocks and a scaled motion vector of a corresponding search block in the current subimage of the lowest frequency band in the (M−i+1)st layer;
   (d3) generating a plural number of candidate blocks in each search regions for each search block, wherein the size of a candidate block is identical to that of the search block;
   (d4) calculating error values between each of the search blocks and candidate blocks to thereby select an optimum candidate block for each search region for each search block, wherein the optimum candidate block yields a minimum error value;
   (d5) comparing error values of optimum candidate blocks for each search block with each other to thereby select a smallest error value;
   (d6) providing displacements from the search blocks to the optimum candidate blocks corresponding to the smallest error value as a motion vector of each search block in the current subimage;

(d7) increasing i by 1 and repeating the steps (d1) to (d6) until i becomes M−1; and (d8) providing motion vectors of search blocks in the current subimage of the lowest frequency band for the 1st layer when i becomes M−1.

5. The method as recited in claim 4, wherein the step (d2) includes the steps of:

(d21) detecting a location, which is same as that of a search block, in the previous subimage of the lowest frequency band in the (M−i)th layer, for each search block;

(d22) displacing the detected location by as much as motion vectors of neighboring search blocks and a scaled motion vector of a corresponding search block in the current subimage of the lowest frequency band in the (M−i+1)st layer to thereby generate displaced locations, for each search block; and (d23) forming search regions around the displaced locations, for each search block.

6. The method as recited in claim 5, wherein the scaled motion vector is obtained by multiplying a motion vector of the corresponding search block in the current subimage of the lowest frequency band in the (M−i+1)st layer by 2.

7. The method as recited in claim 6, wherein the value of M is 4 and the value of p is 2.

8. An apparatus for detecting motion vectors between a current and a reference frames of a video signal, comprising:

means for wavelet transforming the current frame to thereby produce an M number of hierarchical current images with M being greater than 1, wherein a current image of a highest hierarchy corresponds to the current frame, a current image of a higher hierarchy has a higher resolution than a current image of a lower hierarchy, and the respective current images have an identical number of search blocks, each search block of the lower hierarchy corresponding to a search block of the higher hierarchy;

means for wavelet transforming the reference frame to provide an M number of hierarchical reference images, wherein a reference image of a highest hierarchy corresponds to the reference frame, a reference frame of a hierarchy including candidate blocks corresponding to each search block of the hierarchy and sizes of each search block of the hierarchy and the candidate blocks corresponding thereto being identical to each other;

means for finding an optimum candidate block of a search block of the lowest hierarchy based on displacement vectors of neighboring search blocks to thereby detect a displacement vector for the search block, wherein the neighboring search blocks are adjacent to the search block and whose displacement vectors are already detected and the displacement vector represents the displacement between the search block and the optimum candidate block; and means for obtaining a displacement vector of a search block of the highest hierarchy based on the detected displacement vector and thereby setting the obtained displacement vector as a motion vector of the search block of the highest hierarchy.

9. The apparatus according to claim 8, wherein sizes of search blocks of a hierarchy are identical to each other.

10. The apparatus according to claim 9, wherein a size of each search block of the lowest hierarchy is P×Q pixels, P and Q being greater than 1.

11. The apparatus according to claim 10, wherein the means for finding an optimum candidate block of a search block of the lowest hierarchy includes:

means for motion estimating a search block of the lowest hierarchy with respect to its corresponding candidate blocks in search regions in order to find a suitable candidate block for each of the search region, wherein the search regions are formed based on displacement vectors of neighboring search blocks;

means for determining an optimum candidate block of the search block among the suitable candidate blocks, wherein the optimum candidate block generate a minimum motion estimation error among the suitable candidate blocks; and means for deciding a displacement vector for the search block of the lowest hierarchy, the displacement vector for the lowest hierarchy corresponding to the displacement between the optimum candidate block and the search block of the lowest hierarchy.

12. The apparatus according to claim 11, wherein the means for obtaining the displacement vector includes:

means for motion estimating a search block of a hierarchy with respect to its corresponding candidate blocks in search regions in order to find a suitable candidate block for each of the search region, wherein the search regions are formed based on displacement vectors of neighboring search blocks and a displacement vector obtained for a search block of a next lower hierarchy;

means for determining an optimum candidate block of the search block among the suitable candidate blocks, wherein the optimum candidate block generate a minimum motion estimation error among the suitable candidate blocks;

means for deciding a displacement vector for the search block of the hierarchy, the displacement vector for the hierarchy corresponding to the displacement between the optimum candidate block and the search block of the hierarchy; and means for repeatedly motion estimating a search block of a next higher hierarchy and deciding a displacement vector therefor until the displacement vector of the search block of the highest hierarchy is obtained.

13. The apparatus according to claim 12, wherein a size of a search block of a hierarchy is 2×2 times larger than a size of a search block of a next lower hierarchy.

14. The apparatus according to claim 13, wherein M, P and are 4, 2 and 2, respectively.

* * * * *